United States Patent [19]

Hagiwara et al.

[11] Patent Number: 4,814,914
[45] Date of Patent: Mar. 21, 1989

[54] DISC DRIVING DEVICE HAVING A REINFORCED BASE

[75] Inventors: Ippei Hagiwara; Etsuo Tamura; Kazuhiro Yasumoto, all of Nakatsugawa, Japan

[73] Assignee: Mitsubishi Denki Kabushiki Kaisha, Tokyo, Japan

[21] Appl. No.: 878,893

[22] Filed: Jun. 26, 1986

[30] Foreign Application Priority Data

Jun. 27, 1985 [JP] Japan .................. 60-140942
Dec. 24, 1985 [JP] Japan .............. 60-198501[U]

[51] Int. Cl.⁴ ........................ G11B 5/012; G11B 23/02
[52] U.S. Cl. .................... 360/98.08; 360/133
[58] Field of Search ............... 360/86, 97–99, 360/133, 135, 137; 369/258, 269, 270, 292, 75.1; 310/67, 90; 346/137

[56] References Cited

U.S. PATENT DOCUMENTS

| 3,786,290 | 1/1974 | Papst et al. | 310/90 |
| 3,814,960 | 6/1974 | Burgbacher | 310/67 |
| 4,190,870 | 2/1980 | Avina et al. | 360/98 |
| 4,519,010 | 5/1985 | Elsaesser et al. | 360/97 |
| 4,623,810 | 11/1986 | Smith | 310/90 |

FOREIGN PATENT DOCUMENTS

| 58-30965 | 2/1983 | Japan . | |
| 60-85481 | 5/1985 | Japan | 360/97 |
| 60-10772 | 5/1985 | Japan | 360/97 |

Primary Examiner—John H. Wolff
Attorney, Agent, or Firm—Armstrong, Nikaido, Marmelstein & Kubovcik

[57] ABSTRACT

Disclosed herein is a disc driving device comprising a base having a fixed substrate and a cylindrical retaining portion integrally formed with the substrate, a rotating shaft rotatably supported to the retaining portion a rotatable hub fixed to the rotating shaft and surrounding the retaining portion, the rotatable hub being provided with an information recording disc at an outer circumference thereof, a driving means for applying a rotational force to the hub, and a reinforcing member provided in the substrate and the retaining portion of the base, the reinforcing member being made of materials having rididity higher than that of the substrate and the retaining portion.

6 Claims, 2 Drawing Sheets

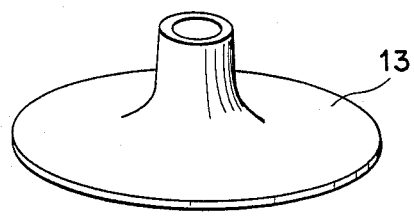
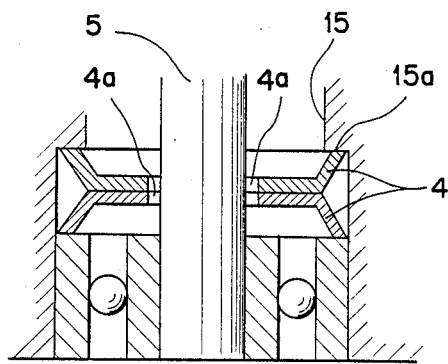
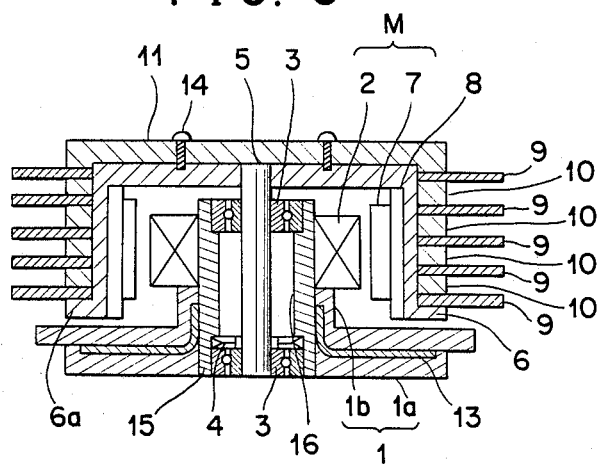

DISC DRIVING DEVICE HAVING A REINFORCED BASE

BACKGROUND OF THE INVENTION

This invention relates to a disc driving device for rotating an information recording disc such as a magnetic disc.

The disc driving device for rotating the information recording disc such as a magnetic disc is known in Japanese Utility Model Laid-open No. 58-30965, for example.

FIG. 1 is a vertical sectional view of a conventional magnetic disc driving device as described in Japanese Utility Model Laid-open No. 58-30965. Referring to FIG. 1, a base 1 comprises a substrate 1a and a cylindrical retaining portion 1b integrally formed with the substrate 1a. An annular stator 2 is mounted on the outer circumference of the retaining portion 1b. Two bearings 3 are fitted to the inner circumference at upper and lower ends of the retaining portion 1b. Reference numeral 4 designates a pre-pressure spring. A rotation shaft 5 is rotatably supported through the bearings 3 to the retaining portion 1b. A cylindrical hub 6 is so provided as to surround the retaining portion 1b, and is comprised of a top wall 6b fixed to the upper end of the rotating shaft 5 and a flange 6a formed at the lower end of the hub 6. A rotor magnet 7 is mounted through a rotor yoke 8 to the inside wall of the hub 7 in opposed relation with the stator 2. The rotor magnet 7 and the stator 2 form a driving means M for applying a rotational force to the hub 6. A plurality of information recording discs 9 are mounted to the outer circumference of the hub 6, and are layered on the flange 6a with plural spacers 10 interposed therebetween. A cap 11 is fixedly mounted on the top wall 6b of the hub 6 to fix the magnetic discs 9 together with the spacers 10. A magnetic shield plate 12 is provided on the base 1 so as to reduce influence of undue magnetic leakage from the rotor magnet 7, etc. to the outside of the device.

In operation, when a field of the rotor magnet 7 is detected by a magnetism sensing device (not shown) for example to detect a position of the rotor magnet 7, and current to the stator 2 is changed according to the position of the rotor magnet 7, the hub 6 fixed to the shaft 5 supported through the bearings 3 to the base 1 is rotated by utilizing an electromagnetic force between the rotor magnet 7 and the stator 2 to thereby rotate the magnetic discs 9 fixed to the hub 6. Further, magnetic leakage from the rotor magnet 7, etc. to the outside of the device is reduced by the magnetic shield plate 12.

However, in the disc driving device of this type, since information recording/reproducing accuracy is remarkably reduced due to slight play of the rotating shaft, a high dimensional accuracy at the engaged portion between the bearings 3 and the base 1 is severely required. To this end, the base 1 is made of well workable materials such as aluminum. However, since aluminum or the like has a relatively small strength in contrast with a good workability, a bearing portion of the base 1 is apt to be flexed or inclined due to imbalance at the rotating portion. As a result, vibration of the rotating shaft 5 is increased to reduce the information recording/reproducing accuracy. Furthermore, in order to suppress such flexing or inclination of the bearing portion as greatly as possible, thickness of the base 1 cannot be so reduced, and therefore it is difficult to make the device compact.

SUMMARY OF THE INVENTION

It is an object of the present invention to solve the aforementioned problems and provide a disc driving device which may be made compact and may exhibit a high accuracy with reduced shaft vibration.

It is another object of the present invention to prevent large flexing or inclination of the bearing portion of the base in spite of that the base is made of well workable materials and that it is reduced in thickness.

According to the present invention, there is provided a reinforcing member in the substrate and the retaining portion of the base. The reinforcing member is made of materials having rigidity higher than that of the substrate and the retaining portion.

BRIEF DESCRIPTION OF THE DRAWINGS

FIG. 3 is a perspective view of a reinforcing member in the preferred embodiment;

FIG. 4 is an enlarged sectional view of an essential part in FIG. 2; and

FIG. 5 is a vertical sectional view of a central part of a magnetic disc driving device in another preferred embodiment of the present invention.

DETAILED DESCRIPTION OF THE PREFERRED EMBODIMENTS

Figure 1:
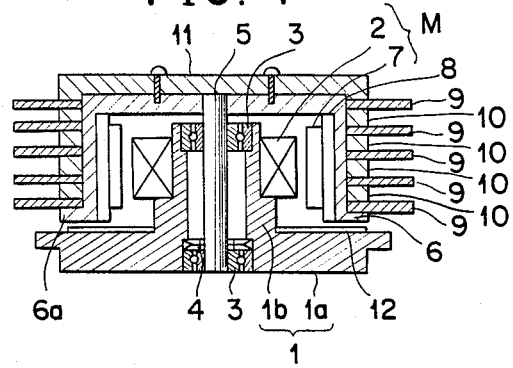
FIG. 1 is a vertical sectional view of a central part of an exemplary magnetic disc driving device in the prior art.

There will be now described a preferred embodiment of the present invention with reference to the FIGS. 2–5, in which the same or corresponding parts as employed in the prior art shown in FIG. 1 are designated by the same numerals, and explanation of the parts will be omitted.

Figure 2:
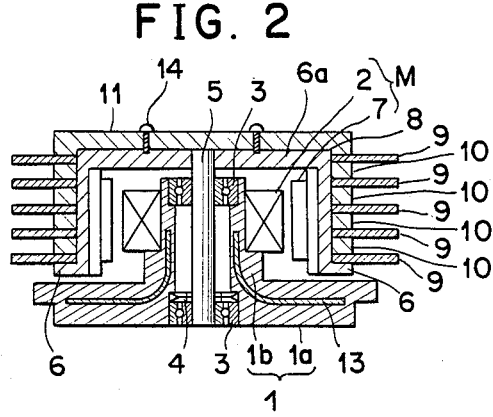
FIG. 2 is a vertical sectional view of a central part of a magnetic disc driving device in a preferred embodiment of the present invention.

Referring to FIG. 2 which shows a vertical sectional view of a central part of the magnetic disc driving device, reference numeral 13 designates a reinforcing member formed of a magnetic steel plate such as a silicon steel plate. The reinforcing member 13 is provided in a substrate 1a and a retaining portion 1b of a base 1. As shown in FIG. 3, the reinforcing member 13 is integrally formed by press molding a thin magnetic steel plate such that it is provided with a projection of a cylindrical central portion thereof in correspondence with the shape of the base 1, and is embedded in the base 1 made of aluminum, etc. The magnetic shield plate 12 used in the prior art shown in FIG. 1 is not provided in the preferred embodiment. Reference numerals 14 designate mounting screws for the cap 11.

There will be described the operation, in which the principle of rotation of the driving means M is the same as in the aforementioned prior art. If there exists weight imbalance with respect to the rotational center of the rotating unit, that is, the hub 6, discs 9, spacers 10, cap 11, rotor yoke 8 and rotor magnet 7, the shaft 5 is apt to incline due to the imbalance. In this case, if a gap between the retaining portion 1b of the base 1 and the bearings 3 is small, vibration of the shaft due to the inclination is reduced. As the base 1 in the preferred embodiment is made of well workable materials such as aluminum, the gap may be reduced. Concurrently, the retaining portion 1b of the base 1 is sometimes flexed or inclined because of inbalance in the rotating unit. However, since the reinforcing member 13 of a magnetic steel plate is embedded in the base 1, rigidity of the base 1 as a whole is improved. Accordingly, even if the thickness of the base 1 is very small, flexing and inclination of the retaining portion 1b of the base 1 are extensively reduced as compared with the base not including the reinforcing member. Accordingly, vibration of the shaft 5 may be reduced, and the reduction in recording and reproducing accuracy of the discs 9 may be prevented. Furthermore, thermal deformation of the base 1 is reduced since a coefficient of thermal extension of the retaining portion 1b is substantially identical with that of the bearings 3.

Although there is not provided in the preferred embodiment a magnetic shield plate for preventing magnetic leakage from the rotor magnet 7, etc., the reinforcing member 13 functions as the magnetic shield plate since it is a magnetic steel plate. Accordingly, magnetic leakage may be prevented with a reduced number of parts.

Referring to FIG. 4 which shows an enlarged sectional view of the pre-pressure springs 4 and the associated parts, the pre-pressure springs 4 are formed of a resilient thin plate, and is in a circular dish-like shape having central holes 4a through which the shaft 5 is inserted. A pair of pre-pressure springs 4 are arranged upside down with respect to each other, and are inserted under compression in a space defined between a large diameter portion 15a of a central through-hole 15 of the base 1 and the lower bearing 3.

Referring to FIG. 5 which shows another preferred embodiment, a support cylinder 16 is provided so as to support the bearings 3. The support cylinder 16 is made of materials having rigidity higher than that of the base 1, such as stainless steel, preferably a non-magnetic material. The stator 2 is mounted on the outer circumferential surface of the support cylinder 16, and the support cylinder 16 is tightly fitted with the central through-hole 15 of the base 1. The bearings 3 are fixed at the upper and lower end portions of the support cylinder 16. The other arrangement is the same as of the previous embodiment. The operation and effect of the second embodiment are the same as of the first embodiment.

What is claimed is:

1. A disc driving device, comprising:
 a rotary shaft;
 a cup fixed on said rotary shaft;
 a plurality of discs fixed on an outside periphery of said cup;
 an annular stator fixed at an inside of said cup;
 a stationary base for rotatably supporting said rotary shaft, said base having a disc-shaped substrate portion and a central cylindrical retaining portion directly arising from a center of said disc-shaped substrate portion into which central cylindrical retaining portion said rotary shaft is inserted; and
 a reinforcing member retained within said stationary base, said reinforcing member having a disc-shaped flat portion and a central cylindrical portion directly arising from the center of said disc-shaped flat portion, said disc-shaped flat portion being extended into said disc-shaped substrate portion and said central cylindrical portion being extended into said central cylindrical retaining portion so as to reinforce said disc-shaped substrate portion and said central cylindrical retaining portion of said stationary base, wherein said substrate portion and said retaining portion are made of aluminum and said reinforcing member is made of a magnetic steel plate.

2. The disc driving device according to claim 1, wherein said reinforcing member is integrally formed with said base.

3. The disc driving device according to claim 1, wherein said reinforcing member is embedded within both said substrate portion and said retaining portion.

4. The disc driving device according to claim 1, further comprising a plurality of bearings mounted within said retaining portion of said base for supporting said rotary shaft.

5. The disc driving device according to claim 1, further comprising a plurality of bearings mounted within said retaining portion of said base and a bearing holder provided between at least one of said bearings and said base for retaining a periphery of said bearing, and said bearing holder being made of a material having a coefficient of thermal expansion smaller than that of said base.

6. The disc driving device according to claim 1, wherein said central cylindrical retaining portion is a support cylinder independent from said substrate portion and is made of a material having rigidity higher than that of said substrate portion.

* * * * *